Dec. 22, 1953 F. BERMAN 2,663,576
UTILITY ATTACHMENT FOR AUTOMOBILE STEERING WHEELS
Filed Aug. 19, 1950 2 Sheets-Sheet 1
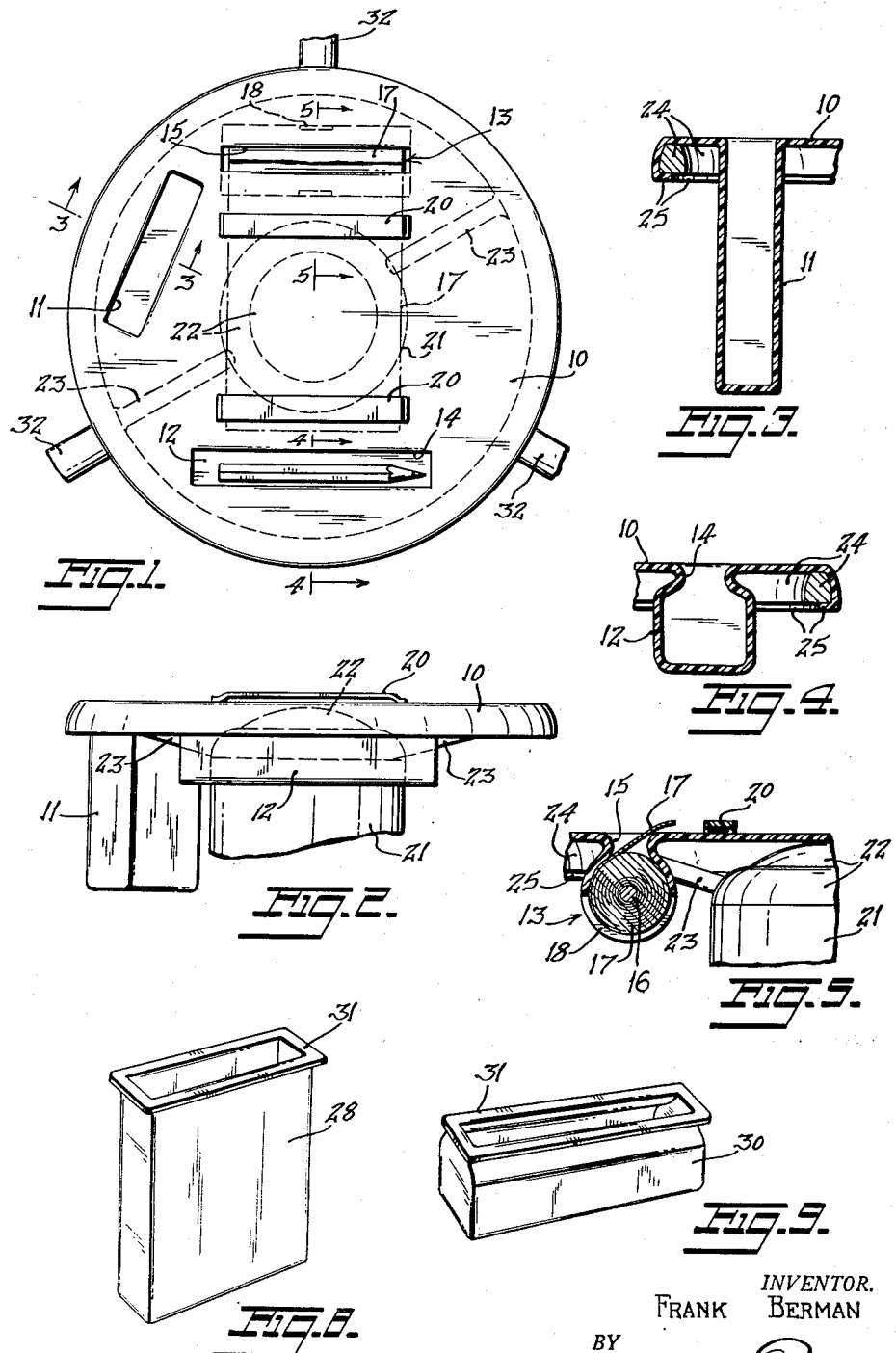
INVENTOR.
FRANK BERMAN
BY
ATTORNEY Dec. 22, 1953  F. BERMAN  2,663,576
UTILITY ATTACHMENT FOR AUTOMOBILE STEERING WHEELS
Filed Aug. 19, 1950  2 Sheets-Sheet 2
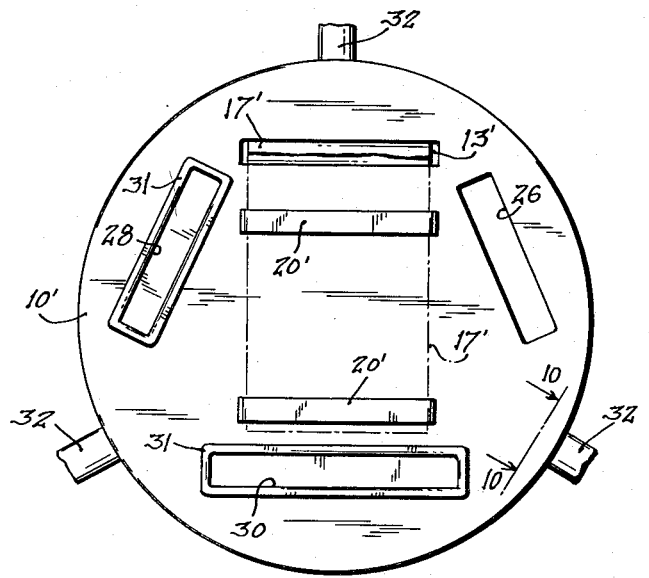
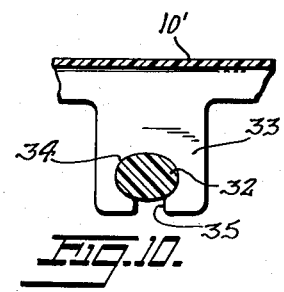
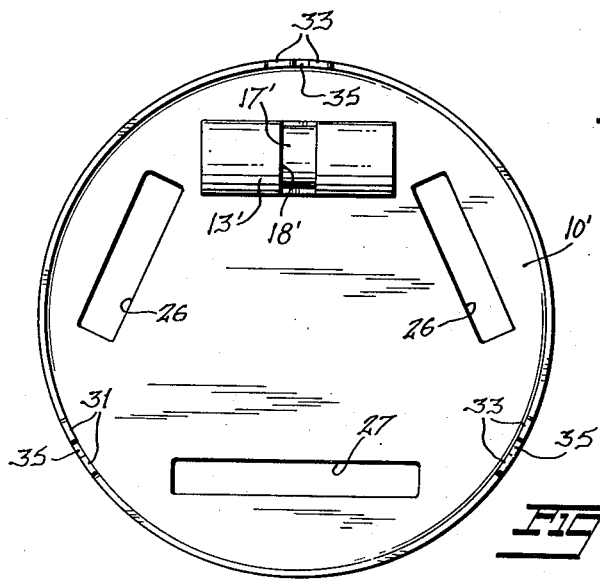
INVENTOR.
FRANK BERMAN
BY
ATTORNEY Patented Dec. 22, 1953

2,663,576

UNITED STATES PATENT OFFICE 2,663,576

UTILITY ATTACHMENT FOR AUTOMOBILE STEERING WHEELS

Frank Berman, Pewaukee, Wis.

Application August 19, 1950, Serial No. 180,497

3 Claims. (Cl. 281—12)

This invention relates to a novel multipurpose storage unit mountable on the steering wheel of an automobile.

One object of the invention is the provision of a unit mountable on an automobile steering wheel for storing therein articles frequently needed by the driver of the automobile, such as cigarettes, matches, flashlight, pencil, writing tablet, etc.

Another object of the invention is to provide for mounting the unit on the several general types of steering wheels.

Another object of the invention is to provide the unit with built-in writing tablet means, and also with a writing surface for writing on said writing tablet means.

Still another object of the invention is to construct said unit so that the driver's view of the automobile dashboard is not obscured or impeded.

A further object of the invention is to construct the unit so that provision is made for the addition of article receptacles thereto by the user.

For further comprehension of the invention, and of the objects and advantages thereof, reference will be had to the following description and accompanynig drawings, and to the appended claims in which the various novel features of the invention are more particularly set forth.

In the accompanying drawings forming a material part of this disclosure:

Fig. 1 is a plan view of one form of the invention in place on an automobile steering wheel.

Fig. 2 is a side elevation of the device with the steering column broken away.

Fig. 3 is a fragmentary sectional view on line 3—3 of Fig. 1.

Fig. 4 is a fragmentary sectional view on line 4—4 of Fig. 1.

Fig. 5 is a fragmentary sectional view on line 5—5 of Fig. 1.

Fig. 6 is a plan view of a modified form of the invention.

Fig. 7 is a fragmentary view from beneath, of the device of Fig. 6, with certain parts left out.

Fig. 8 is a perspective view of a removable pocket for the device of Fig. 6.

Fig. 9 is a perspective view of a removable trough for the device of Fig. 6.

Fig. 10 is a fragmentary sectional view on line 10—10 of Fig. 6.

The storage unit for the steering wheel of an automobile according to the first form of the present invention shown in Figs. 1 to 5, includes a large disc 10 of transparent plastic material having formed integral therewith a deep pocket 11, a trough 12, and a second pocket 13. The pocket 11, see also Fig. 3, is adapted to receive a flashlight, a pack of cigarettes or the like. The trough 12 is long and shallow and is adapted to receive pencils or pens or the like, see also Fig. 4. In order that the said pencils or pens will not be dislodged from the trough when disc 10 is turned rapidly, said trough is formed with a laterally narrow mouth portion as indicated at 14, which narrow mouth tends to maintain articles in the trough.

The pocket 13, see also Fig. 5, is substantially circular in lateral cross-section and has a narrow mouth 15 compared with the full diameter of the body portion thereof. Adapted to pocket 13 is a spindle 16 of narrower diameter than the mouth 15 of the pocket. Thus, the said spindle is readily insertable into the pocket. Wound on the spindle 16, after the same is in the pocket, is a roll of paper tape 17, said tape increasing the diameter of the roll substantially beyond the width of mouth 15. It will be seen, therefore, that when the tape 17 is wound on spindle 16 the same is locked in the pocket but is free to rotate to feed the tape out of the pocket. To facilitate the rolling of the tape on the spindle when the same is in the pocket, the wall of the pocket is provided with a peripheral slot 18 through which the fingers can be extended, see Figs. 1 and 5.

In order that the tape 17, when pulled from pocket 13, can be held down for writing purposes, a pair of parallel spaced strips 20 are cemented at their ends to the upper face of disc 10, see Figs. 1, 4 and 5. It will readily be seen that the tape 17 may be engaged beneath said strips for writing purposes, the disc 10 providing a suitable surface for such operation.

The disc 10 is adapted to be mounted on the steering wheel of an automobile. This is accomplished in a variety of ways in accordance with the construction of the steering wheel. However, in general, one of three methods is used, namely, the disc is secured atop a base plate which in turn is secured on the horn button at the center of the steering wheel, as disclosed in my co-pending application Ser. No. 171,355, now Patent No. 2,650,836, issued September 1, 1953. The disc is secured on the horn ring; or the disc is secured on the spokes of the steering wheel.

In Figs. 1 and 2 there is shown a fragment of a steering column 21 surmounted by a horn button 22. Projecting radially from button 22 are a pair of arms 23 which support a horn ring 24 of ordinary construction. According to the invention, the peripheral edge of disc 10 is turned downward and flanged inward as at 25, see Figs 3 and 4.

The construction is such that the flange 25 of disc 10 may be snapped beneath the ring 24 to secure the former on the latter. It will also be noted that at its center the disc 10 engages the top of button 22, and thus is centrally as well as peripherally supported.

The means whereby a disc is supported on the spokes of a steering wheel is illustrated in Figs. 6–10 wherein a modified form of disc also is illustrated. In these figures like parts are given the same reference numerals as hereinabove with a prime added.

In this form of the invention the disc 10' may be provided with a pocket 13' like in all respects the pocket 13 described above. However, instead of the pocket 11 and the trough 12, the disc 10' is provided with one or more rectangular holes 26 and with a larger rectangular hole 27, see Figs. 6 and 7. Also provided are one or more pockets 28 and a trough 30 each having at its open end a perimetral lip or flange 31, see Figs. 8 and 9.

The construction is such that one or more of the pockets 28 and the trough 30 may be utilized or not, as desired. The ones which are utilized are mounted in the holes 26 and 27 and their perimetral flanges 31 are cemented to disc 10'. When so secured to said disc, the pockets 28 and the trough 30 are in all respects like the pockets 11 and trough 12 described above.

The disc 10' is mounted on the spokes 32 of a steering wheel. To this end the peripheral edge of disc 10' is turned down, as shown in Figs. 7 and 10, such down-turned portion being provided with an extension 33 for each spoke 32. Each extension 33 is provided with a hole 34 of the same outline as a spoke 32, said hole being connected with the under edge of the extension by a narrow slot 35.

The construction is such that the disc 10' can be mounted on the spokes 32 by snapping the latter into the holes 34 through the slots 25. As the first described form of the invention the center of disc 10' preferably engages the horn button at the center of the steering wheel.

It will be seen that, due to the transparency of the discs 10 and 10', the driver's view of the automobile dashboard is not obscured thereby. Further, the use of the horn is not hindered in any way by the said discs.

It is to be mentioned that either disc may be mounted in any of the described ways, or, if desired, by the use of straps or adhesives or clipping devices.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A unit, mountable upon an automobile steering wheel having a horn button at its center and the automobile including a dash board forwardly of the steering wheel, comprising a large disc, a plurality of flanges depending from the periphery of the disc, each including slotted terminals adapted for snapping engagement with the spokes of the steering wheel, the disc including a central portion adapted for engagement with the horn button and provided with a plurality of pockets permitting ready access thereto by the driver, and the disc being formed of transparent plastic material whereby the dash board of the automobile is visible through the disc to the driver, wherein one of the pockets is characterized by an elongated cylinder integral with and depending laterally from the disc, the pocket having an elongated mouth extending through the surface of the disc, the mouth being substantially narrower than the diameter of the pocket, an elongated spindle of a diameter narrower than the mouth of the pocket and loosely contained in the pocket, the spindle being adapted while in the pocket to have a paper tape received through the mouth of the pocket and wound thereon, and the pocket being provided in its underside with an open slot adapted to receive the fingers for winding the paper tape.

2. The combination of claim 1 wherein the disc includes parallel spaced strips for retaining the tape for writing thereon.

3. A unit, as set forth in claim 1, wherein the disc is characterized as having a central portion adapted for engagement with the horn of the automobile.

FRANK BERMAN.

References Cited in the file of this patent

UNITED STATES PATENTS

| Number | Name | Date |
|---|---|---|
| D. 159,454 | Waltman | July 25, 1950 |
| 879,082 | Cave | Feb. 11, 1908 |
| 1,147,592 | Armstrong | July 20, 1915 |
| 1,174,651 | Austin | Mar. 7, 1916 |
| 1,432,015 | Burnett | Oct. 17, 1922 |
| 1,450,446 | Nelson | Apr. 3, 1923 |
| 1,564,608 | Moore | Dec. 8, 1925 |
| 1,883,714 | Gray | Oct. 18, 1932 |
| 2,038,822 | Bins | Apr. 28, 1936 |
| 2,150,709 | Bake | Mar. 14, 1939 |
| 2,176,708 | Douglas | Oct. 17, 1939 |
| 2,518,127 | Dobbs | Aug. 8, 1950 |

FOREIGN PATENTS

| Number | Country | Date |
|---|---|---|
| 754,598 | France | Aug. 28, 1933 |